United States Patent
Burns et al.

(10) Patent No.: US 6,741,747 B1
(45) Date of Patent: May 25, 2004

(54) DATA COMPRESSION

(75) Inventors: James Edward Burns, Basingstoke (GB); Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 556 days.

(21) Appl. No.: 09/715,411

(22) Filed: Nov. 17, 2000

(30) Foreign Application Priority Data

Nov. 18, 1999 (GB) ............................................. 9927329

(51) Int. Cl.[7] ............................... G06K 9/36; G06K 9/46
(52) U.S. Cl. ........................ 382/239; 382/251; 382/252
(58) Field of Search ................................. 382/232, 234, 382/236, 238, 239; 348/390.1, 420.1, 475–554; 375/240.01, 240.02, 240.03, 240.04, 240.19, 240.26

(56) References Cited

U.S. PATENT DOCUMENTS 5,768,431 A * 6/1998 Saunders et al. ........... 382/239
5,892,545 A * 4/1999 Saunders et al. ........ 348/390.1

FOREIGN PATENT DOCUMENTS

| EP | 0 540 961 | 5/1993 |
|----|-----------|--------|
| EP | 0 772 362 | 5/1997 |
| GB | 2 335 815 | 9/1999 |

* cited by examiner

Primary Examiner—Leo Boudreau
Assistant Examiner—Duy M. Dang
(74) Attorney, Agent, or Firm—Frommer Lawrence & Haug LLP; William S. Frommer

(57) ABSTRACT

Data compression apparatus for compressing an input data unit to produce an output data unit in accordance with a desired data quantity of the output data unit, the degree of compression being determined by a compression control variable having a range of possible values. A trial encoder compresses successive sections of the input data unit in accordance with a trial group of two or more values of the compression control variable. A data quantity detector detects the trial data quantities generated by each trial encoding of the sections of the input data unit and selects a base compression control variable applicable to the input data unit on the basis of the detected trial data quantities, in order to comply with the desired data quantity. An allocator allocates a compression control variable for use in final encoding each section of the input data unit to generate the output data unit, the allocator being comparable to determine whether to use the base compression control variable or another possible value of the compression control variable for the current section.

14 Claims, 7 Drawing Sheets

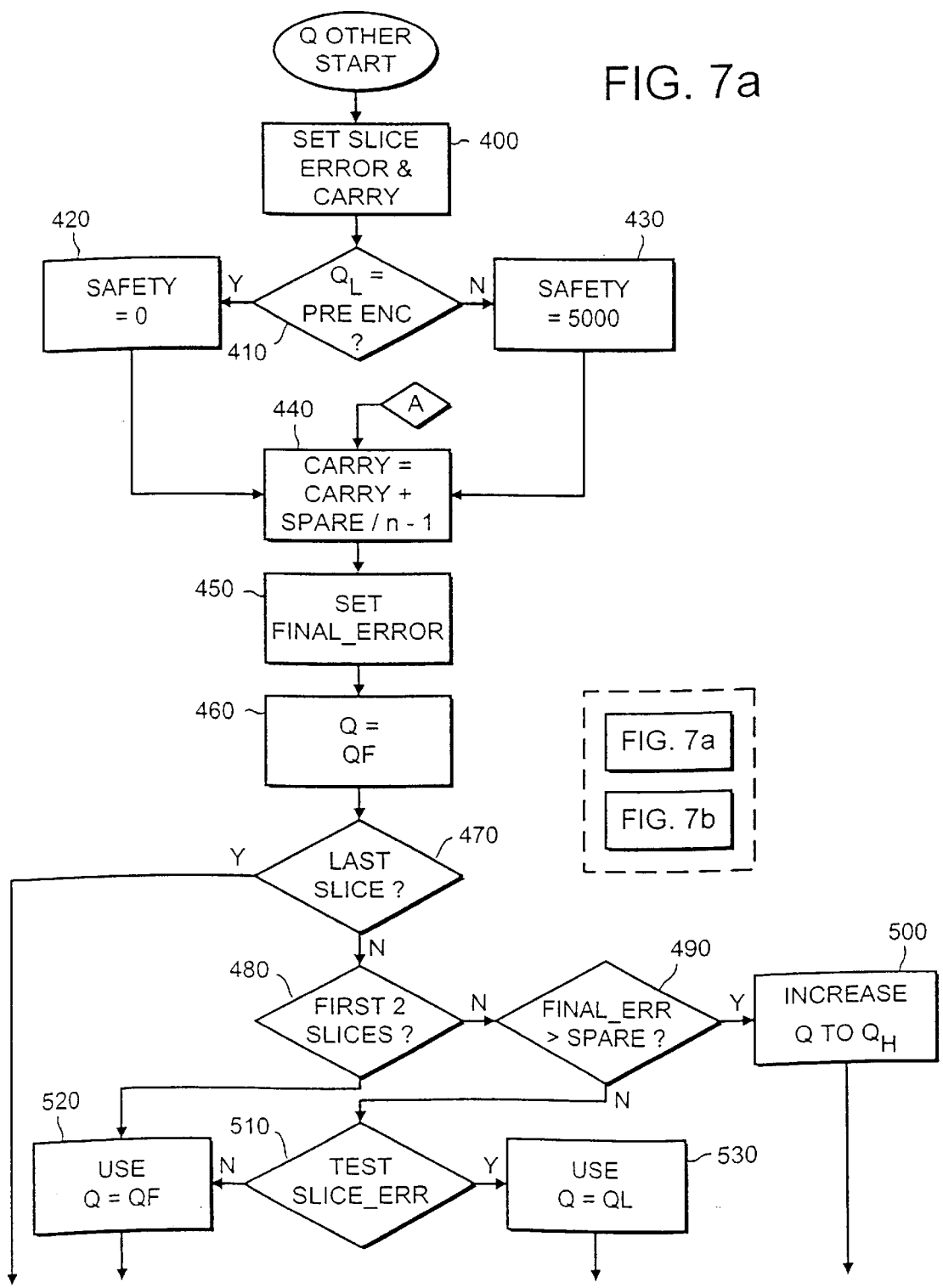

DATA COMPRESSION

BACKGROUND OF THE INVENTION

1. Field of the Invention

This invention relates to data compression. At least preferred embodiments of the invention relate to video data compression.

2. Description of the Prior Art

It has long been recognised that some video data compression systems, such as systems broadly defined by the MPEG-2 standard, use compression techniques in which the number of compressed data bits generated for a picture, or a part of a picture, depends on the nature of the image represented by that picture. Also, the main compression parameter which can be altered from block to block or picture to picture to change the bit rate, namely the degree of quantisation, has a somewhat non-linear and difficult to predict effect on the resulting bit rate.

These characteristics are of particular concern in systems such as video tape recorders, where there is generally a fixed allocation of bits for each picture or group of pictures (GOP) and little or no scope for exceeding that fixed allocation. As a result, techniques for bit rate control in video data compression are very important.

The so-called "Test Model 5" of the MPEG 2 system proposes a rate control algorithm that allocates bits between pictures in accordance with a "global complexity estimation" dependent upon the actual number of bits generated in respect of a preceding picture and the quantisation parameters used to achieve this. The actual bit rate achieved during compression of a picture is then monitored and the degree of quantisation varied during compression to try to achieve the desired total bit rate for that picture. This system can, however, be slow to react to changes in image type during the compression of a picture and cannot predict the presence of difficult-to-encode image portions (requiring a higher bit rate) towards the end of a particular picture. Also, it is difficult for such a system to react to a rapidly changing picture content, such as that caused by a scene change.

Another previously proposed system described in GB-A-2 306 831 uses a system of trial encoding of at least part of a picture or group of pictures in order to assess the most appropriate degree of compression for use with those pictures. In particular, a "binary search" technique is proposed whereby an multi-stage process is used to iterate towards the required quantisation factor. However, such a multi-stage process to narrow the search down to the required quantisation factor is expensive in terms of the delay it adds to the processing chain as well as the actual processing overhead involved.

SUMMARY OF THE INVENTION

This invention provides data compression apparatus for compressing an input data unit to produce an output data unit in accordance with a desired data quantity of the output data unit, the degree of compression applied by the apparatus being determined by a compression control variable having a range of possible values;

the apparatus comprising:
a trial encoder for compressing successive sections of the input data unit in accordance with a trial group of two or more values of the compression control variable, the trial group being a subset of the range of possible values of the compression control variable;

a data quantity detector for detecting the trial data quantities generated by each trial encoding of the sections of the input data unit and for selecting a base compression control variable applicable to the input data unit on the basis of the detected trial data quantities, in order to comply with the desired data quantity; and an allocator for allocating a compression control variable for use in final-encoding each section of the input data unit to generate the output data unit, the allocator being operable to determine whether to use the base compression control variable or another possible value of the compression control variable for a current section by a comparison between (a) the increase in data quantity determined for compression of the current section using a next less harsh compression value from the trial group; and (b) the maximum possible increase in data quantity, while still complying with the desired data quantity, over that obtained if the remainder of the input data unit were compressed using the base compression control variable.

The invention provides a data compression apparatus which addresses the shortcomings of both the predictive and the "full" trial encoding systems outlined above.

The invention operates to trial encode a current input data unit (e.g. an image) and so avoids the lack of responsiveness which can be experienced by the TM5 type of technique, particularly at scene changes. However, by deliberately trial-encoding at only a subset (and preferably a non-adjacent subset) of the possible values of the compression control variable (e.g. the quantisation factor Q) and then subsequently deriving a decision on which value to use based on the trial group of values, the invention alleviates the processing overhead and delay of the system of GB-A-2 306 831.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
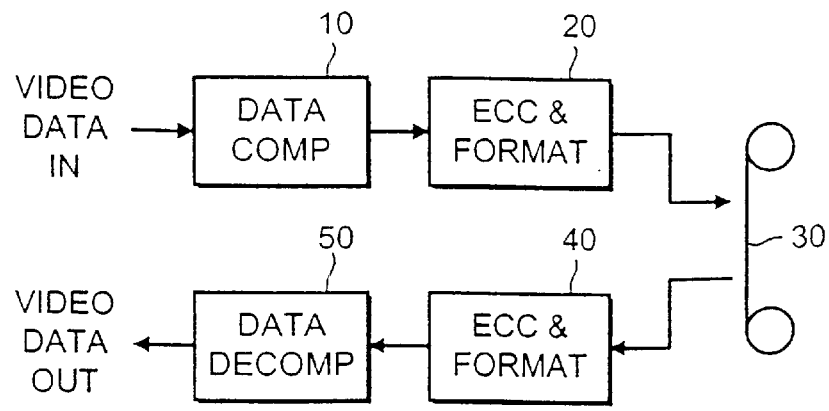
FIG. 1 schematically illustrates a video tape recorder.

FIG. 1 is a schematic diagram of a video tape recorder (VTR) using data compression. Video data received by the VTR is supplied first to a data compression apparatus 10 in which the data quantity of the video data is reduced by compression techniques to be described below. The compressed video data is then passed to an error correcting code (ECC) processor and formatter which formats the data into an appropriate form for storage on tape and adds various error correcting codes in accordance with conventional techniques. The formatted data is then stored on a tape medium 30.

At replay, data is read from the tape medium 30 and processed by an ECC processor and formatter 40. This uses the ECC to detect any errors resulting from the data storage process and, hopefully, to correct them. It also re-formats the data into an appropriate form for decompression. Decompression is then carried out by a data decompression apparatus 50 which is arranged to provide a decompression process complimentary to the compression process applied by the data compression apparatus 10.

The key features of the embodiment which will be described below are found in the data compression apparatus 10. The remaining parts of FIG. 1 may be implemented using known techniques.

Figure 2:
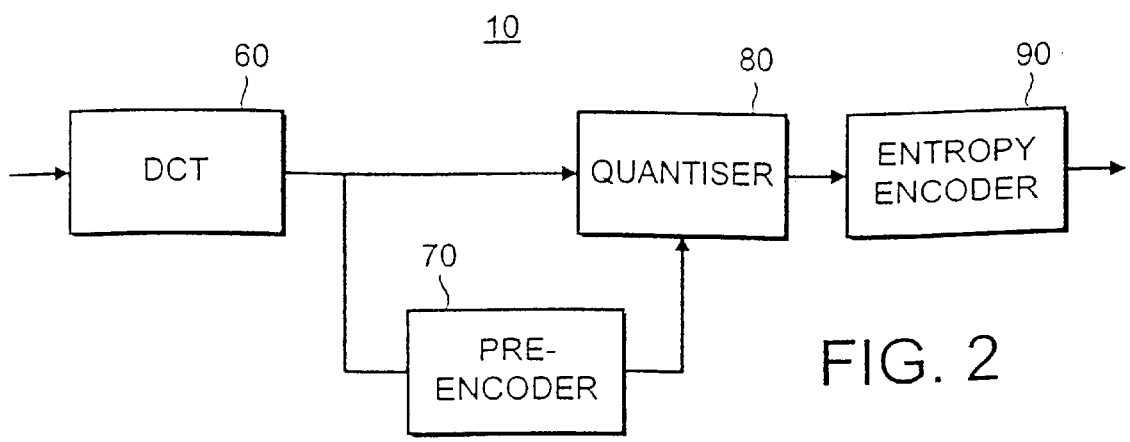
FIG. 2 schematically illustrates a data compression apparatus.

FIG. 2 is a schematic diagram of the data compression apparatus 10.

The VTR described in connection with this embodiment uses so-called "I" (intra) pictures only. So, unlike some implementations of systems such as MPEG-2, each picture (generally a frame) is compressed without reference to adjacent or nearby pictures. While this means that some of the compression efficiency which is possible with a long-GOP system using P frames and B frames cannot be achieved, it does mean that editing can easily take place at any desired frame boundary in the video signal. So, an I-frame VTR is particularly suited for studio use.

The fact that only I-frames are used means that the diagram shown in FIG. 2 is much simpler than a conventional long-GOP encoder.

So, FIG. 2 illustrates a DCT encoder 60, a pre-encoder 70, a quantizer 80 and an entropy encoder 90. The DCT encoder 60 operates to decompose the picture into blocks of 8×8 pixels and to apply a discrete cosine transform to generate a corresponding matrix of 8×8 DCT coefficients representing increasing spatial frequency components. (It is noted here that in other embodiments of the invention other transformations could of course be used, such as a wavelet transformation).

In parallel with the DCT process, the pre-encoder 70 examines the input images and allocates a proportion of the available number of bits for encoding each image (which is generally a fixed quantity because of storage constraints imposed by the tape medium 30) to different areas of the image. In the present example, the allocation is carried out on a macroblock (MB) by macroblock basis. Here, the term macroblock refers to an array of 16×16 pixels, i.e. four DCT blocks. The specific operation of the pre-encoder will be described in much more detail below but, in general terms, as its output it supplies target data quantities for each macro to the quantizer 80.

The quantizer 80 carries out a thresholding and quantization process which involves zeroing coefficients below a certain threshold and quantizing the remaining ones, with the degree of quantization being selected in order to control the resulting output data quantity and also to account (in a conventional way) for image attributes such as so-called image activity which can vary from area to area within the image.

Finally, the entropy encoder 90 carries out run length coding and variable length (Huffmann) coding so that more frequently occurring bit patterns within the run length encoded sequence are encoded to form shorter output data words. Again, it is noted that other types of entropy encoding are of course applicable as well or instead.

The system described above can operate using:either of two sets of possible quantisation factors, a "linear" set, in which successive values are evenly spaced throughout the available range, or a "non-linear" set, in which the values are more closely spaced towards the lower (less harsh quantisation) end of the range.

The complete "linear" and non-linear sets of quantisation factors Q for the MPEG system are as follows:
Linear: 2 4 6 8 10 12 14 16 18 20 22 24 26 28 30 32 34 36 38 40 42 44 46 48 50 52 54 56 58 60 62
Non-linear: 1 2 3 4 5 6 7 8 10 12 14 16 18 20 22 24 28 32 36 40 44 48 53 56 64 72 80 88 96 104 112

In the present embodiments, a "reduced" non-linear set of possible quantisation values are used, in order to ease the processing requirements of the system. The reduced non-linear set is as follows:
Non-linear: 1 2 3 4 5 6 8 10 12 14 16 18 20 24 28 32 36 40 44 48 53 56

In other words, the values 7, 22 and 64–112 have been omitted. The maximum quantisation factor in the non-linear set is now 56 and in the linear set the maximum is 62.

Figure 3:
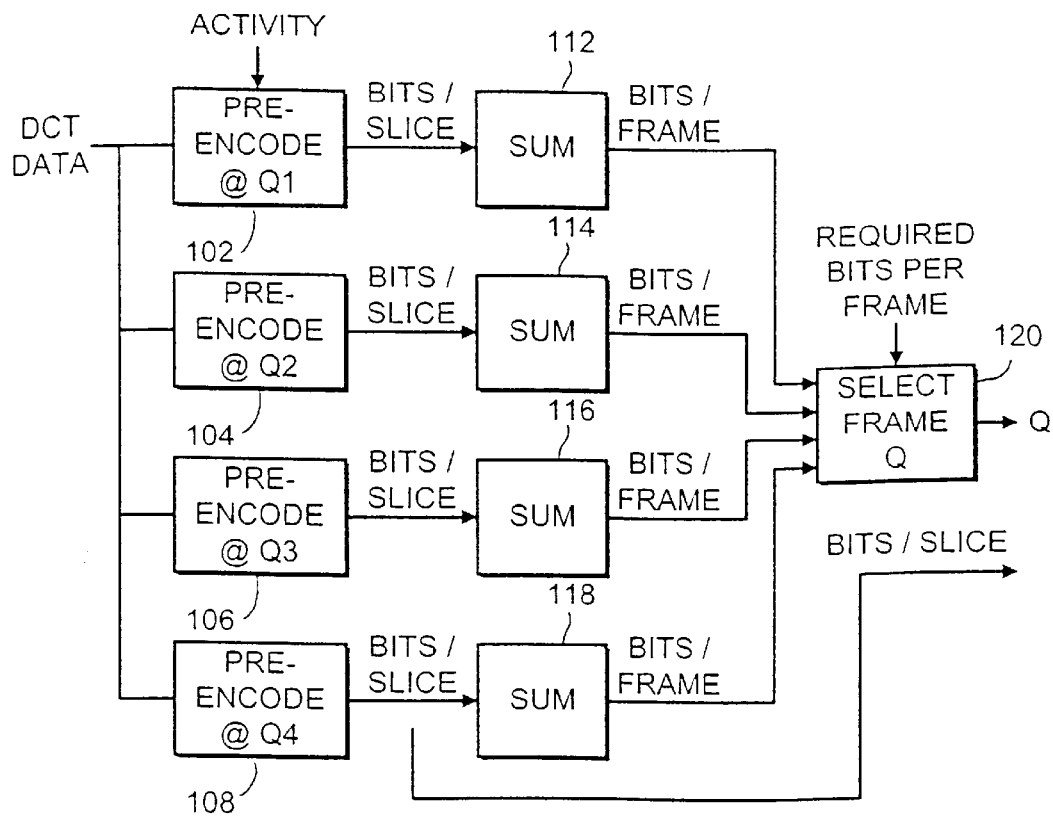
FIG. 3 schematically illustrates a pre-encoder.

FIG. 3 schematically illustrates the operation of the pre-encoder 70.

The pre-encoder 70 comprises four pre-encode units 102, 104, 106, 108 operating in parallel to pre-encode DCT data received from the DCT encoder 60 using respective quantisation factors. So-called image "activity" is taken into account in a conventional way.

For both the non-linear and the linear options, the following Q values are used in the four pre-encoders:

102 Pre-encode 1: use Q1=2+activity
104 Pre-encode 2: use Q2=6+activity
106 Pre-encode 3: use Q3=10+activity
108 Pre-encode 4: use Q4=20+activity Each of the four pre-encoders operates on an image slice by image slice basis, where a slice is defined as an image area at least one macroblock high and at least one macroblock wide. The slices are preferably all the same size, though this is not essential to the operation of the system. The pre-encoders generate output data representing the number of data bits which would be generated if each slice were encoded with that quantisation value.

The sets of "bits per slice" figures from each of the four pre-encoders 102 . . . 108 are summed over a complete image (e.g. a complete frame) by respective summation processors 112, 114, 116, 118. These generate "bits per frame" figures which are passed to a Q selector 120.

Figure 4:
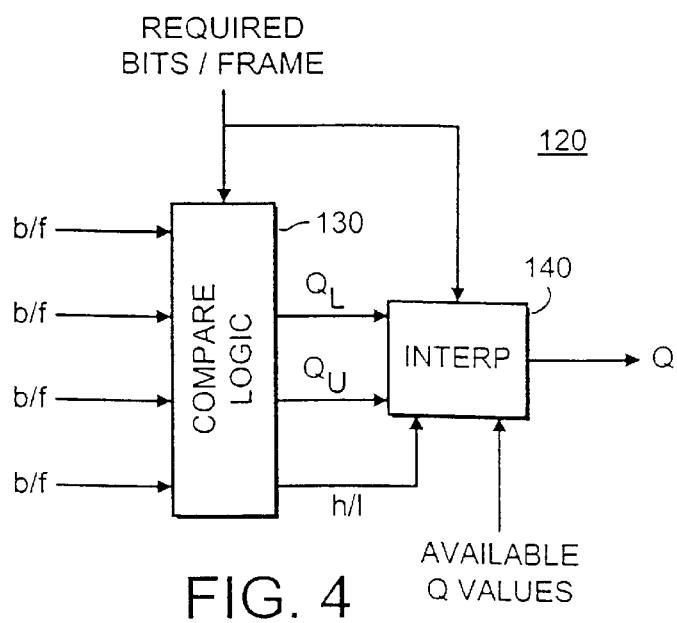
FIG. 4 schematically illustrates a quantisation factor selector.

The Q selector 120 is shown schematically in more detail in FIG. 4, but in brief its operation is to select a "base" quantisation factor for the entire image on the basis of the four "bits per frame" figures received from the summation processors. In doing this, it compares the bits per frame obtained by pre-encoding with the required bits per frame of the overall compression system. Its output is a single Q value to be passed to the quantiser 80. The bits per slice figures generated by each of the pre-encoders 102 . . . 108 are also passed to the quantiser 80.

Referring now to FIG. 4, the Q selector comprises compare logic 130 and an interpolator 140.

The compare logic 130 receives the four bits/frame figures from the summation processors 112 . . . 118 and compares each figure with the required bits per frame for the overall system. The outputs of the compare logic are two pre-encode quantisation values $Q_U$ and $Q_L$ and a high/low flag. Three conditions will now be described, depending on whether the required bits per frame value lies within the range of the four pre-encode results, below that range or above that range.

(a) Required Bits/Frame Lies Within the Range of the Pre-encode Results

The usual situation is that the required bits per frame lies between two of the bits per frame values obtained through pre-encoding. In fact, the pre-encode quantisation factors are in fact deliberately chosen so that this happens for a majority of images for the particular bit rate (50 Mbps) of the current system. In this circumstance, the compare logic 130 outputs the quantisation factors which led to the generation of the nearest pre-encode bits/frame values to either side of the required number of bits per frame and sets the h/l flag to indicate "no overflow or underflow". In particular, $Q_U$ is the pre-encode quantisation factor which gave the highest number of bits not to exceed the required bits per frame, and $Q_L$ is the pre-encode quantisation factor which gave the lowest number of bits to exceed the required bits per frame[1].

[1] In this embodiment, because each coefficient is divided by the value Q, a numerically smaller Q implies a less harsh quantisation of the input data. So, $Q_L$ represents a less harsh quantisation (generating more bits) than $Q_U$. Of course, this is just a definition by convention and the opposite convention could instead be used.

Where valid $Q_L$ and $Q_U$ have been generated, that is, where the required bits per frame lies between two pre-encoder bits/frame values, the frame Q value can be selected by linear interpolation between $Q_L$ and $Q_U$. For each available quantisation value x between $Q_L$ and $Q_U$, an estimate est_bits(x) is calculated of the number of bits which would be generated if x were used:

$$\text{est\_bits}(x) = \text{pre-encode}(Q_L) - (x - Q_L) * \left( \frac{\text{pre-encode}(Q_L) - \text{pre-encode}(Q_U)}{Q_U - Q_L} \right)$$

where pre-encode($Q_L$) and pre-encode($Q_U$) are the actual number of bits obtained during pre-encoding of the frame using $Q_L$ and $Q_U$ respectively.

This equation is applied repeatedly to obtain the lowest value of x for which:

$$\text{est\_bits}(x) \leq \text{required bits per frame}$$

The value of x meeting this requirement is selected as the frame quantisation factor Q.

(b) Required Bits/Frame Lies Below the Range of the Pre-encode Results

In this situation, all of the pre-encoders have generated too many bits, so a quantisation factor higher than the highest pre-encode value (Q4=20) needs to be selected. The high/low flag is set by the compare logic to "high" to indicate that a higher quantisation value than 20 needs to be used. This flag causes the interpolator to alter its operation, as described below.

In empirical trials of a prototype 50 Mbps system this situation has not been observed, but the following algorithm to be followed by the interpolator 140 is included as a precaution.

Linear interpolation can no longer be used to select a Q value. So, in order to test values of Q above the highest pre-encode value of Q=20, the following formula is used to provide est_bits(x):

$$\text{est\_bits}(x) = \text{pre-encode}(Q=20) - (x-20) * \left( \frac{0.5 * \text{pre-encode}(Q=20)}{Q_{\max} - 20} \right)$$

where $Q_{max}$ is the maximum Q value in the relevant range, i.e. 62 in the linear set and 56 in the non-linear set. This equation assumes that the number of bits will fall by about half from Q=20 to Q=$Q_{max}$.

Again, this equation is applied repeatedly to obtain the lowest value of x for which:

$$\text{est\_bits}(x) \leq \text{required bits per frame}$$

The value of x meeting this requirement is selected as the frame quantisation factor Q.

(c) Required Bits/Frame Lies Above the Range of the Pre-encode Results

In this situation, all of the pre-encoders have generated too few bits, so a quantisation factor lower than the lowest pre-encode value (Q1=2) may need to be selected. Of course, the option of a still-lower quantisation value is available only in the non-linear Q set. If the linear set is in use then the following description does not apply and Q=2 would be used.

The high/low flag is set by the compare logic to "low" to indicate that a lower quantisation value than 2 needs to be used. This flag causes the interpolator to alter its operation, as described below.

It is noted here that estimates by extrapolation of the number of bits which would be generated if Q=1 were used are prone to large uncertainties.

To assess the number of bits which would be generated if Q=1 were used, a different formula, reflecting the potentially large increase in bits obtained when the quantisation factor is changed from Q=2 to Q=1, is used to estimate the quantity est_bits(Q=1):

$$\text{est\_bits}(x) = \text{pre-encode}(Q=2) - 2 * \left( \frac{\text{pre-encode}(Q=2) - \text{pre-encode}(Q=6)}{4} \right)$$

where pre-encode(Q=2) and pre-encode(Q=6) are the actual number of bits obtained during pre-encoding of the frame using quantisation values of 2 and 6 respectively.

If the results of this test, est_bits(Q=1), meet the following requirement:

$$\text{est\_bits}(x) \leq \text{required bits per frame}$$

then Q for the frame is set by the interpolator 140 to Q=1.

In summary, as a result of the above processing, a value of Q for the whole frame is passed from the Q selector 120 to the quantiser 80.

Figure 5:
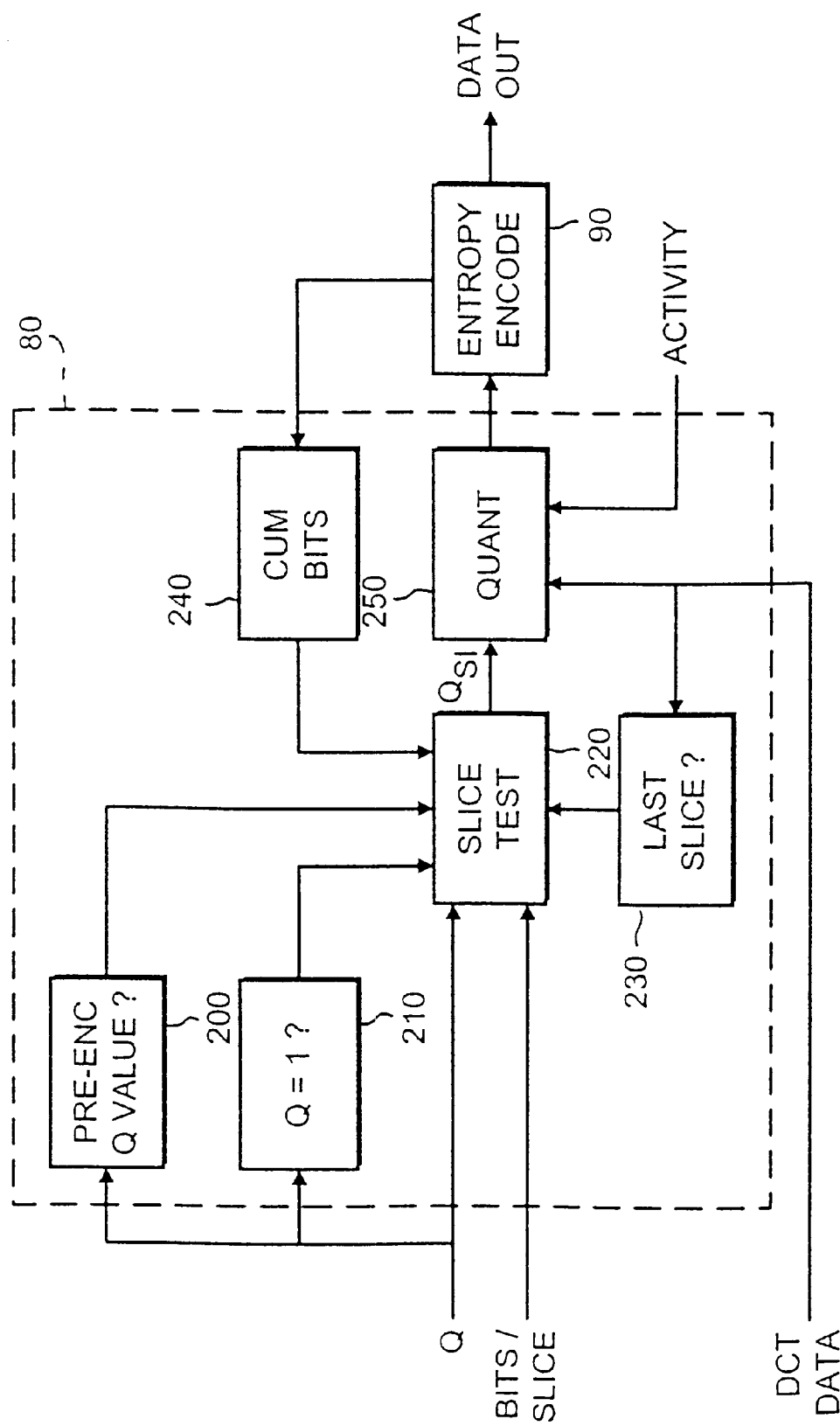
FIG. 5 schematically illustrates a quantiser and entropy encoder.

FIG. 5 schematically illustrates the quantiser 80 and the entropy encoder 90. The quantiser 80 comprises first and second test logic 200, 210, a slice tester 220, a last slice detector, a bit accumulator 240 and a quantisation unit 250.

The first and second test logic 200, 210 receive the Q value selected by the Q selector 120 and test whether it is a pre-encode Q value (2, 6, 10 or 20) and whether it is the value Q=1. The results of these tests are passed to the slice tester 220 and affect its operation as described below.

The slice tester 220 receives the Q value selected by the Q selector, the bits per slice figures from the pre-encoders 102 . . . 108 and test results from the first and second test logic 200, 210, the last slice detector 230 and the bit accumulator 240. The slice tester operates to select a Q value, $Q_{sl}$ for each slice of the image.

The quantising unit 250 and a last slice detector 230 receive DCT data from the DCT encoder 60. The last slice detector 230 detects whether the current DCT data represents the last slice of an image, and passes this information as a control signal to the slice tester 220. The quantising unit quantises data from each image slice in accordance with the Q value, $Q_{sl}$, selected by the slice tester 220 for that slice and also the image activity of that slice.

The entropy encoder 90 performs entropy encoding on the quantised data from the quantising unit 250. The number of bits generated by this process is detected and accumulated by the bit accumulator 240, with the result being passed as a control signal to the slice tester 220.

The basic operation of the apparatus shown in FIG. 5 will be described in the context of three situations (as detected and indicated by the first and second test logic 200, 210). These are: (a) where the Q value selected by the Q selector is one of the pre-encode Q values; (b) where the Q value selected by the Q selector is not one of the pre-encode Q values; and (c) the special case where the Q value selected by the Q selector is Q=1.

(a) The Selected Q Value is a Pre-encode Q Value

Figure 6:
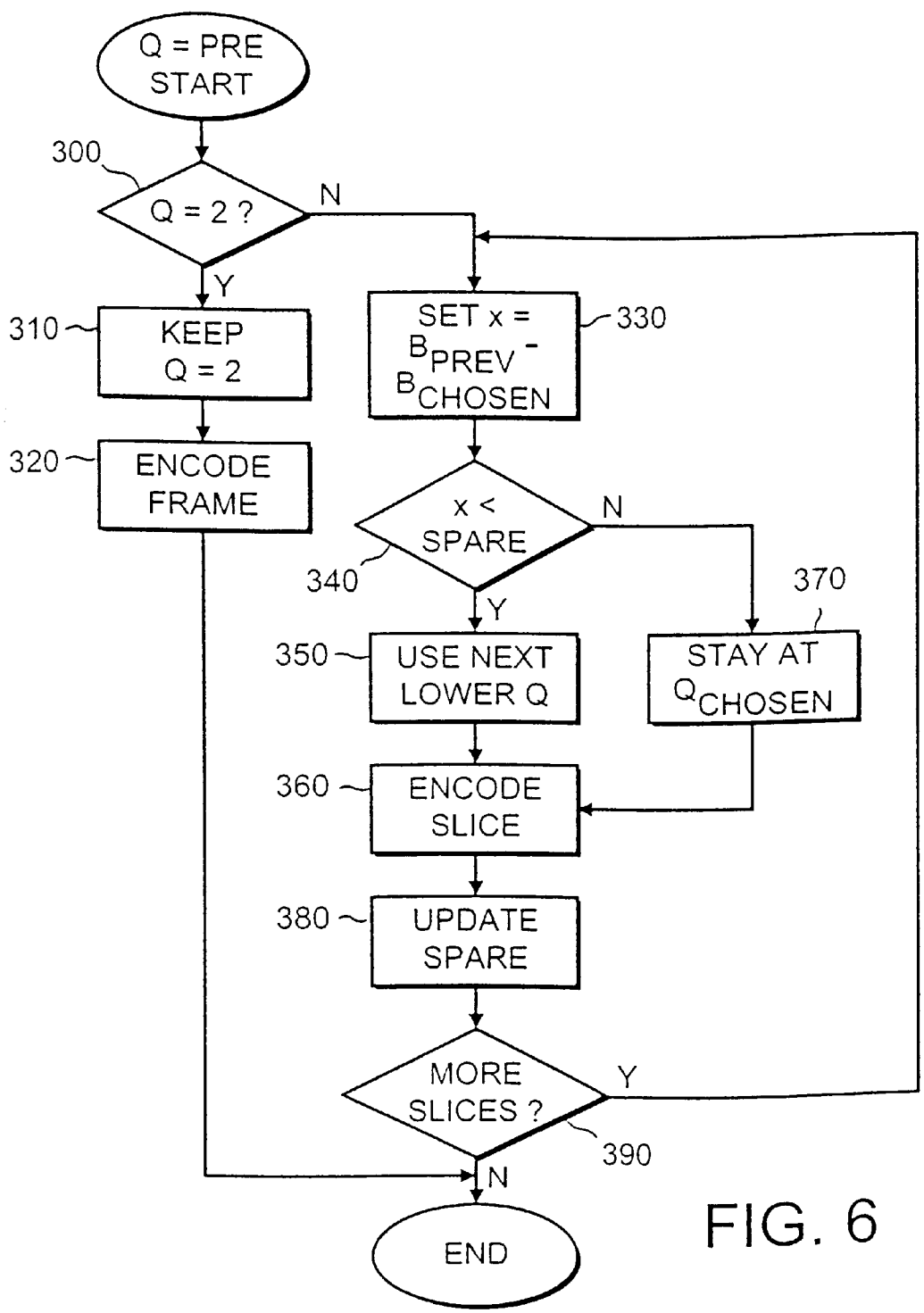
FIGS. 6 to 8 are schematic flow charts illustrating features of the operation of the quantiser and entropy encoder of FIG. 5.

FIG. 6 is a schematic flow chart showing the operations performed by the apparatus of FIG. 5 where the selected Q value is a pre-encode Q value, that is to say Q=2, 6, 10 or 20.

At a step 300, a test is carried out to test whether the selected Q is 2. Q=2 is a special case. No attempt is made to reduce the Q value to the next lowest (Q=1, which is in any event only available in the non-linear set) because estimates of the bit rate for Q=1 have such a large amount of uncertainty attached to them. Accordingly, at a step 310, Q is maintained at 2 and the frame is encoded using Q=2 at a step 320. The process ends as far as that frame is concerned.

In this case where Q=2, because Q=2 was a pre-encode Q value, it is known that the available bit rate will not be exceeded. So, the frame can be safely encoded at that Q value.

Returning to the step 300, if it is found that Q does not equal 2, control passes to a step 330 where a variable x is set:

$$x = \text{pre\_encode\_data}(Q_L) - \text{pre\_encode\_data}(Q_{sl})$$

where $Q_L$ is the next lower Q value in the linear or non-linear set.

At a step 330, x is compared with a variable "spare", where spare is initially defined by:

$$\text{spare} = \text{max\_per\_frm\_bits}(Q_{frm})$$

and:

max_per_frm=maximum allowed bits per frame (1.6×10⁶ bits for a 50 Mbps, 30 frm/s system)

$Q_{frm}$=selected Q for frame bits ($Q_{frm}$)=actual bits produced at $Q_{frm}$ (NB this in fact could apply whether or not $Q_{frm}$ is a pre-encode value, but if it were not a pre-encode value then bits ($Q_{frm}$) would be an estimate)

If it is found that x is less that spare, then the next lower Q value is selected at a step 350. This is the next lower Q value in the available range of Q values, so in the present example the Q value selected at the step 350 will not, by definition, be a pre-encode Q value. The slice is then encoded at a step 360.

(As an aside, there is of course nothing to prevent the pre-encode values being chosen as adjacent Q values in the linear and/or non-linear sets in other embodiments. So, for example, a set of pre-encode Q values could be 2. 8, 10 and 20 where 8 and 10 are adjacent in both the linear and non-linear series. Similarly, there could be more or fewer than four pre-encode Q values).

On the other hand, if x is not less than spare at the step 340; the Q value is kept at the initially selected base Q value at a step 370 and the slice is encoded as the step 360 using the base Q value.

At a step 380 the variable spare is updated according to the following calculation:

$$\text{spare} = \text{spare} - (\text{actual\_slice\_bits} - \text{slice\_bits}(Q_{sl}))$$

Of course, the expression in parentheses in the above equation will be zero if $Q_{sl}$ is the originally selected pre-encode Q value.

Finally, if it is detected at a step 390 that there are more slices to be processed, control returns to the step 330. Otherwise, the process ends as far as the current frame is concerned.

(b) The Selected Q Value is not a Pre-encode Q Value

Figure 7B:
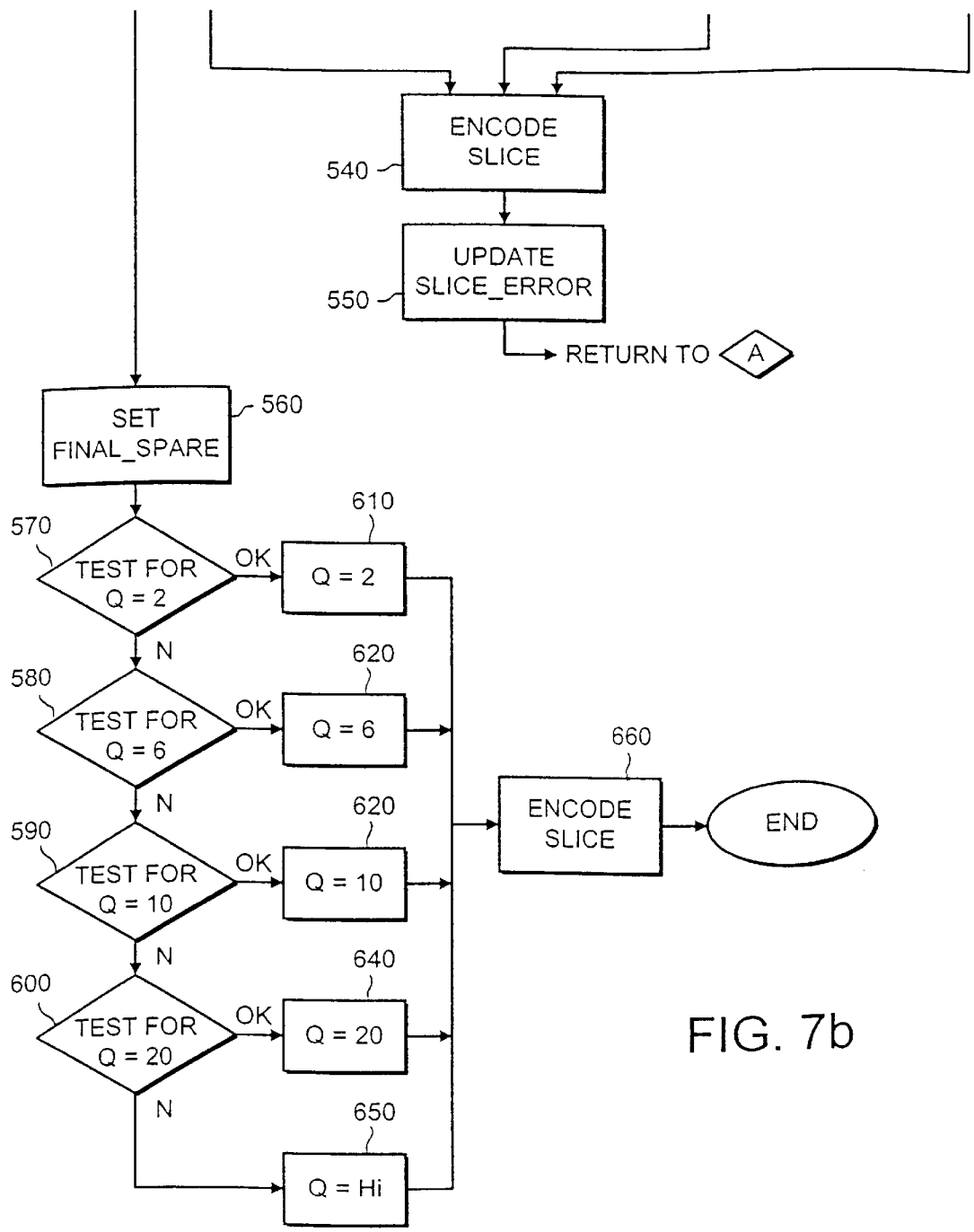

FIG. 7 (formed of FIGS. 7a and 7b which combine to show a single flow chart) schematically illustrates the processing operation carried out where the Q value selected for the frame is not a pre-encode value and is not Q=1.

At a step 400, two variables are initialised, slice_error and carry. The initial settings for these variables are as follows:

slice_error=0 carry=0

Two other values are also defined: $Q_L$ is defined as the Q value immnediately below the selected Q value (in either the linear or the non-linear range as appropriate) and $Q_H$ is the Q value above the selected Q value in the appropriate range.

At a step 410, a test is performed to detect whether $Q_L$ is a pre-encode Q value. This test is important because $Q_L$ represents a less harsh degree of quantisation than the selected Q value, implying a greater data quantity will be generated. If $Q_L$ is a pre-encode value, the system has an absolute measure (from the pre-encoding process) of data quantity produced at $Q_L$. If $Q_L$ is not a pre-encode Q value, however, an estimate has to be produced instead.

So, if $Q_L$ is a pre-encode value, a variable "safety" is set to 0 at a step 410. On the other hand, if $Q_L$ is not a pre-encode value, the variable "safety" is set to a value such as 5000 bits at a step 430. The variable safety represents a safety margin in the calculations that follow, so that an estimate of the data quantity produced at $Q_L$ is compared with the available maximum data quantity minus the safety margin. In other words, it is made harder for $Q_L$ to meet the requirements of not exceeding the available bit rate.

After steps 410 or 430 control passes to a step 440 where the variable "carry" is set using the following formula:

$$\text{carry} = \text{carry} + \frac{\text{spare}}{\text{no\_of\_slices} - 1}$$

A variable final_error is set at a step 450 according to the following formula:

$$\text{final\_error} = \text{no\_of\_slices} \times \left( \frac{\text{slice\_error}}{\text{current\_slice\_no}} \right)$$

At a step 460 Q is reset to the Q value initially selected for the frame by the Q selector. Then, at a step 470, a detection is made as to whether the current slice is the last slice of the current image. If so, control passes to a step 560 to be described below. In the case where the current slice is not the last slice of the current image, control passes to a step 480 where a detection is made as to whether the current slice is one of the first two slices of the current image. If not, then at a step 490 the variable final_error is compared with the variable spare. If final_error is greater than spare then Q is increased at a step 500 to $Q_H$ and the slice is encoded at a step 540. The variable slice_error is updated at a step 550 in accordance with the following calculation:

slice_error=slice_error+(actual_slice_bits−slice_estimate(Q$_{frm}$)

and control then returns the step 440 for the next slice.

If the step 480 detected that this was one of the first two slices, control would pass to a step 520 (see below). Returning to the step 490, if the variable final_error is not greater than the variable spare then control passes to a step 510.

At the step 510, the variable slice_error is tested as follows:

slice_error+slice_estimate(Q$_L$)+safety<(slice_estimate(Q$_{frm}$)+ carry)

If the outcome of this test is negative, that is to say the inequality defined by the above equation is not true, then control passes to a step 520 where Q is set to the selected Q for the frame. The slice is encoded 540 and slice_error is updated 550 as before. If the outcome of this test is positive, that is to say the inequality is true, then Q is set to Q$_L$ at a step 530, the slice is encoded 540 and slice_error is updated 550 as before.

So, it will be seen that the first two slices are always encoded at the selected Q for the frame (via the steps 480 and 520) to build up an early indication of how good the bit estimates are. There is a small danger that large underestimates in the bits produced for the first two slices would cause an overflow of the maximum bits per frame that could not then be corrected. To avoid this, the "safety" bits are included in the calculations.

Returning to the situation where the step 470 detects that the current slice is the last slice, a variable final_spare is set at a step 560, where:

final_spare=spare−slice_error

A series of tests 570, 580, 590 and 600 detect whether any of the pre-encode Q values can be used for this final slice, given the spare data quantity established by the variable final_spare. So, the test carried out at the step 570 is as follows:

slice_pre_encode(Q=2)<slice_est(Q$_{frm}$)+final_spare

If this test is positive, that is to say the inequality defined by the above equation is true, then Q is set to 2 at a step 610. Similar tests follow for Q=6, 10 and 20, with a positive result meaning that Q is set to the test (pre-encode) value. It is noted that the test 580 only takes place if the test 570 is not passed; the test 590 only takes place if the test 580 is not passed and so on.

In the event that none of the four tests is passed, control passes to a step 650 where Q for the last slice is set to the highest available Q value in the appropriate linear or non-linear set.

The final slice is then encoded using the selected Q value at a step 660 and the process ends as far as the current frame is concerned.

(c) The Selected Q Value is Q=1

Figure 8:
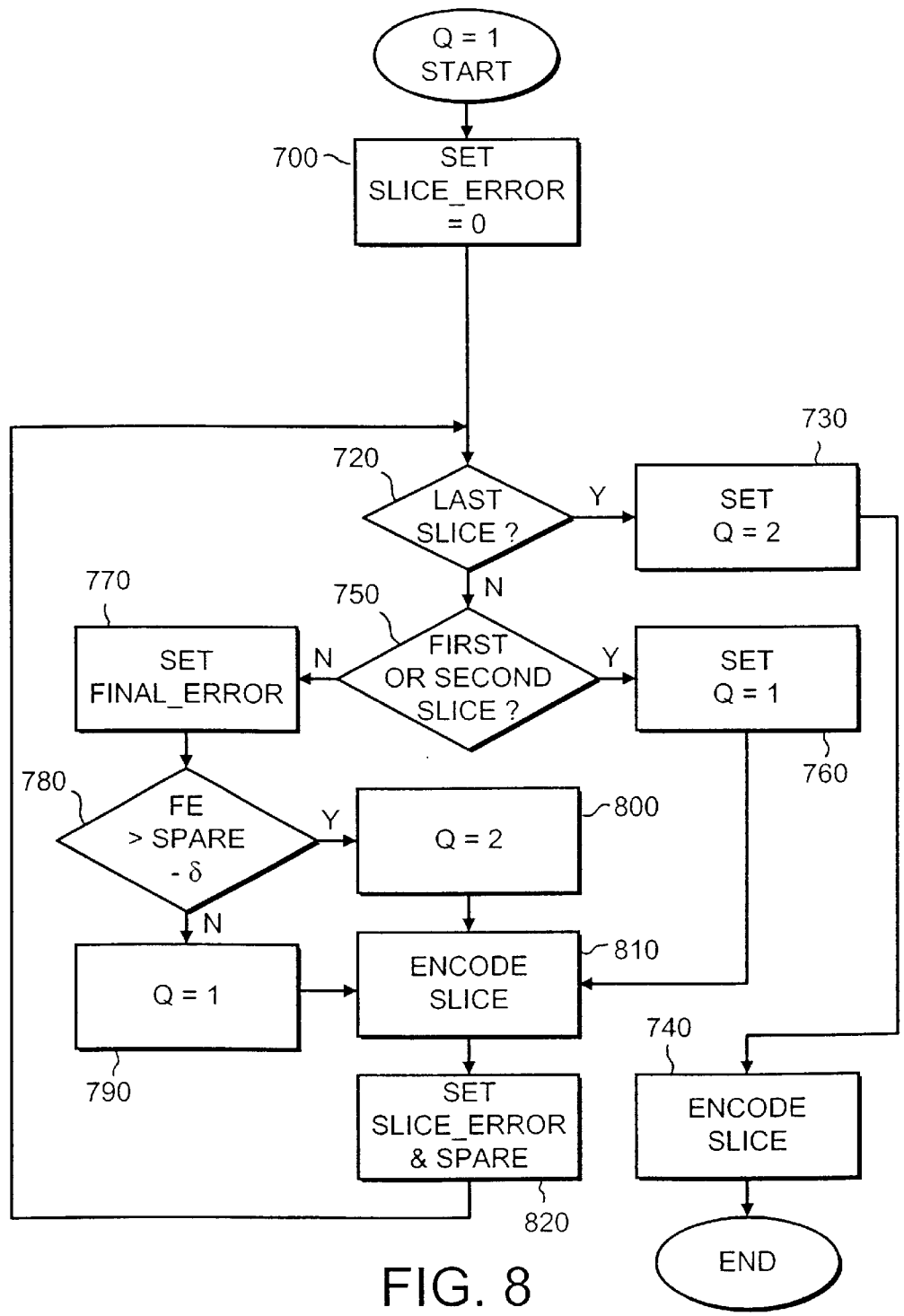

Finally, FIG. 8 concerns the processing which takes place if the Q selector chooses a value Q=1.

It is noted that the value Q=1 is available only in the non-linear set of Q values. Q=1 has a somewhat unpredictable nature, and in many respects does not give a noticeable subjective improvement over Q=2. However, it does have the advantage that in "easy to encode" pictures, moving to Q=1 can appear to make better use of the available bit rate. This is psychologically important for the user, especially in apparatus such as a 50 Mbps VTR with a display readout of the current actual bit rate. The user might feel more comfortable if, having purchased such a VTR, the perceived "best possible use" is seen to be made of the available bit rate of the VTR.

So, on FIG. 8, a variable slice_error is initialised to 0 at a step 700.

At a step 720 a test is performed to detect whether the current slice is the last slice of the current image. If so, then at a step 730 Q is set to 2 and the slice is encoded at a step 740. The process then ends as far as the current frame is concerned.

Setting Q to 2 for the last slice is important because there is no longer an opportunity to correct for any error in the estimate of the data quantity produced at the last slice. So, a pre-encode value of Q=2 is used for absolute safety.

Returning to step 720, if the current slice is not the last slice then a test is carried out at a step 750 to detect whether the current slice is the first or second slice of the current image. If it is, then at a step 760 Q is set to 1. This gives the opportunity at the start of the image to test the bit rate produced for Q=1 (not a pre-encode value) the slice is then encoded at a step 810.

If it is detected at the step 750 that the current slice is not the first or second slice, a variable final_error is set at a step 770. This is an extrapolated rolling prediction of the total deviation from the predicted bit rate (data quantity) for the current frame, which is of course less than the maximum bit rate, which will occur for the whole of the current frame.

The equation for the variable final_error to be given below reflects the fact that it is known from the algorithm that the last slice of the image will be compressed at Q=2, and so will not contribute to the error.

$$\text{final\_error} = \frac{\text{slice\_error} * (\text{no\_of\_slices} - 1)}{\text{current\_slice\_number}}$$

and the actual number of bits for the frame will be:

actual bits=frame_est(Q=1)−slice_estimate(last_slice at Q=1)+ slice_estimate(last_slice at Q=2)

At a step 780 final_error is compared with the variable spare less a safety margin gamma. If final_error is greater than (spare—gamma) then Q is set to 2 at a step 800 and the slice is encoded at a step 810. On the other hand, if final_error is not greater than (spare—gamma) then Q is set to 1 at a step 790 and the slice is encoded a 10. Following the step 810, variables slice_error and spare are updated at a step 820 as described above, and control returns to the step 720.

While a preferred embodiment of the invention relates to an II-VTR using intra (I) pictures only, it will be appreciated that the invention is equally applicable to a system employing GOPs also including B pictures, P pictures or both.

It will also be clear to the skilled man that the techniques described above may be implemented by software running on a general purpose data processing apparatus. In this case, it will be appreciated that such software, and a data carrier such as a magnetic or optical disk bearing such software, are also envisaged as aspects of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data compression apparatus for compressing an input data unit to produce an output data unit in accordance with a desired data quantity of said output data unit, the degree of compression applied by said apparatus being determined by a compression control variable having a range of possible values;

said apparatus comprising:
- (i) a trial encoder for compressing successive sections of said input data unit in accordance with a trial group of two or more values of said compression control variable, said trial group being a subset of the range of possible values of said compression control variable;
- (ii) a data quantity detector for detecting the trial data quantities generated by each trial encoding of said sections of said input data unit and for selecting a base compression control variable applicable to said input data unit on the basis of said detected trial data quantities, in order to comply with the desired data quantity; and
- (iii) an allocator for allocating a compression control variable for use in final-encoding each section of said input data unit to generate said output data unit, said allocator being operable to determine whether to use said base compression control variable or another possible value of said compression control variable for a current section by a comparison between (a) the increase in data quantity determined for compression of the current section using a next less harsh compression value from said trial group; and (b) the maximum possible increase in data quantity, while still complying with said desired data quantity, over that obtained if the remainder of said input data unit were compressed using said base compression control variable.

2. Apparatus according to claim 1, in which said input data unit is data representing an image of a video signal.

3. Apparatus according to claim 2, in which said successive sections of said input data unit are data representing respective portions of the image.

4. Apparatus according to claim 1 in which said data quantity detector is operable to select said base compression control variable by interpolation or extrapolation with respect to said trial group.

5. Apparatus according claim 1 in which said compression control variable is a quantisation parameter.

6. Apparatus according to claim 1 in which said trial group comprises non-adjacent compression control variable values.

7. Apparatus according to claim 1 in which said apparatus is operable using two or more sets of possible values of said compression control variable.

8. Apparatus according to claim 7, in which the sets of possible values of said compression control variable comprise a generally evenly spaced set of values and/or a set of values where the numerical spacing between adjacent values diverges in a monotonic dependence on said values.

9. Apparatus according to claim 8, in which said trial group comprises values of the compression control parameter common to the plural sets of possible values.

10. Apparatus according to claim 1 in which, where said base compression control variable is not part of said trial group, said allocator is operable to compare (a) the increase in data quantity determined for compression of the current section using a next less harsh compression value from said trial group; and (b) the maximum possible increase in data quantity, while still complying with said desired data quantity, over that obtained if the remainder of said input data unit apart from a predetermined set of sections were compressed using said base compression control variable, the predetermined set of sections being compressed using a compression control variable value from said trial group.

11. Apparatus according to claim 1 in which, where said base compression control variable is not part of said trial group, said allocator is operable to reduce the maximum possible increase in data quantity by a predetermined safety margin.

12. A method of data compression in which an input data unit is compressed to produce an output data unit in accordance with a desired data quantity of said output data unit. The degree of compression applied being determined by a compression control variable having a range of possible values;

said method comprising the steps of:
- (i) trial-encoding successive sections of said input data unit in accordance with a trial group of two or more values of said compression control variable, said trial group being a subset of the range of possible values of said compression control variable;
- (ii) detecting said trial data quantities generated by each trial encoding of said sections of said input data unit and for selecting a base compression control variable applicable to said input data unit on the basis of said detected trial data quantities, in order to comply with the desired data quantity; and
- (iii) allocating a compression control variable for use in final-encoding each section of said input data unit to generate said output data unit, said allocator being operable to determine whether to use said base compression control variable or another possible value of said compression control variable for a current section by a comparison between (a) the increase in data quantity determined for compression of the current section using a next less harsh compression value from said trial group; and (b) the maximum possible increase in data quantity, while still complying with said desired data quantity, over that obtained if the remainder of said input data unit were compressed using said base compression control variable.

13. Computer software having program code means for carrying out a method according to claim 12.

14. A data storage medium bearing software according to claim 13.

* * * * *